US010430808B2

(12) United States Patent
Sato et al.

(10) Patent No.: US 10,430,808 B2
(45) Date of Patent: Oct. 1, 2019

(54) NON-TRANSITORY COMPUTER READABLE MEDIUM AND INFORMATION PROCESSING APPARATUS

(71) Applicant: FUJI XEROX CO., LTD., Tokyo (JP)

(72) Inventors: Masahiro Sato, Kanagawa (JP); Hidetaka Izumo, Kanagawa (JP); Takashi Sonoda, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 550 days.

(21) Appl. No.: 14/877,312

(22) Filed: Oct. 7, 2015

(65) Prior Publication Data

US 2016/0307213 A1 Oct. 20, 2016

(30) Foreign Application Priority Data

Apr. 16, 2015 (JP) ................................ 2015-083851

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0201* (2013.01); *G06Q 30/0631* (2013.01)

(58) Field of Classification Search
CPC .......................... G06Q 30/06; G06Q 30/0631
USPC ...................................................... 705/26, 27
See application file for complete search history.

(56) References Cited

U.S. PATENT DOCUMENTS

| | | | | |
|---|---|---|---|---|
| 7,802,200 | B1 * | 9/2010 | Siegel | G06Q 30/0633 705/26.8 |
| 8,285,602 | B1 * | 10/2012 | Yi | G06Q 30/00 705/26.7 |
| 2009/0254971 | A1 * | 10/2009 | Herz | G06Q 10/10 726/1 |
| 2012/0284152 | A1 | 11/2012 | Hashiyama | |
| 2013/0262478 | A1 * | 10/2013 | Kemp | G06F 16/3334 707/748 |
| 2014/0058872 | A1 * | 2/2014 | Sandholm | G06Q 30/0601 705/26.1 |

FOREIGN PATENT DOCUMENTS

| | | | |
|---|---|---|---|
| JP | 9-305571 | A | 11/1997 |
| JP | 2001-265851 | A | 9/2001 |
| JP | 2008-176398 | A | 7/2008 |
| JP | 2008-282132 | A | 11/2008 |

(Continued)

OTHER PUBLICATIONS

Dippold et. al.: "Variable selection for market basket analysis," Mar. 4, 2012 Springer-Verlag 2012; Google, 22 pgs.. (Year: 2012).*

(Continued)

*Primary Examiner* — Robert M Pond
(74) *Attorney, Agent, or Firm* — Sughrue Mion, PLLC

(57) ABSTRACT

A non-transitory computer readable medium stores a program causing a computer to execute a process including calculating a value indicating a complementarity and a value indicating a substitutability, the values each being calculated as information indicating a relationship between multiple items on a basis of browsing history information and purchase history information of the items.

10 Claims, 5 Drawing Sheets

START
S1 INITIALIZE COMPLEMENTARITY AND SUBSTITUTABILITY OF EACH ITEM TO 1
S2 PERFORM CLUSTERING ON USERS FROM BROWSING HISTORY AND PURCHASE HISTORY
S3 CALCULATE PROBABILITY OF BROWSING ITEM FOR EACH ITEM ON PER USER CLUSTER BASIS
S4 CALCULATE PROBABILITY OF SIMULTANEOUSLY BROWSING ITEMS IN ONE SESSION ON PER USER CLUSTER BASIS
S5 MULTIPLY EACH OF COMPLEMENTARITY AND SUBSTITUTABILITY BY VALUE OBTAINED BY DIVIDING PROBABILITY OF SIMULTANEOUSLY BROWSING ITEMS BY PRODUCT OF RESPECTIVE ITEMS
S6 CALCULATE PROBABILITY OF PURCHASING ITEM FOR EACH ITEM ON PER USER CLUSTER BASIS
S7 CALCULATE PROBABILITY OF SIMULTANEOUSLY PURCHASING ITEMS IN ONE SESSION ON PER USER CLUSTER BASIS
S8 CALCULATE VALUE BY DIVIDING PROBABILITY OF SIMULTANEOUSLY PURCHASING ITEMS BY PRODUCT OF PURCHASING PROBABILITIES OF RESPECTIVE ITEMS, MULTIPLY COMPLEMENTARITY BY VALUE, AND DIVIDE VALUE BY SUBSTITUTABILITY
S9 CALCULATE, FOR EACH ITEM ON PER USER CLUSTER BASIS, PROBABILITY OF BROWSING ITEM AFTER PURCHASING OF ANY OTHER ITEM
S10 CALCULATE RATIO TO PROBABILITY OF BROWSING ALONE ITEM HAVING UNDERGONE BROWSING PROBABILITY CALCULATION, MULTIPLY COMPLEMENTARITY BY RATIO, AND DIVIDE SUBSTITUTABILITY BY RATIO
END

(56) References Cited

FOREIGN PATENT DOCUMENTS

| | | | |
|---|---|---|---|
| JP | 2011-39909 | A | 2/2011 |
| JP | 2012-123640 | A | 6/2012 |
| JP | 2012-238324 | A | 12/2012 |

OTHER PUBLICATIONS

Communication dated Apr. 2, 2019, from the Japanese Patent Office in counterpart application No. 2015-083851.

* cited by examiner

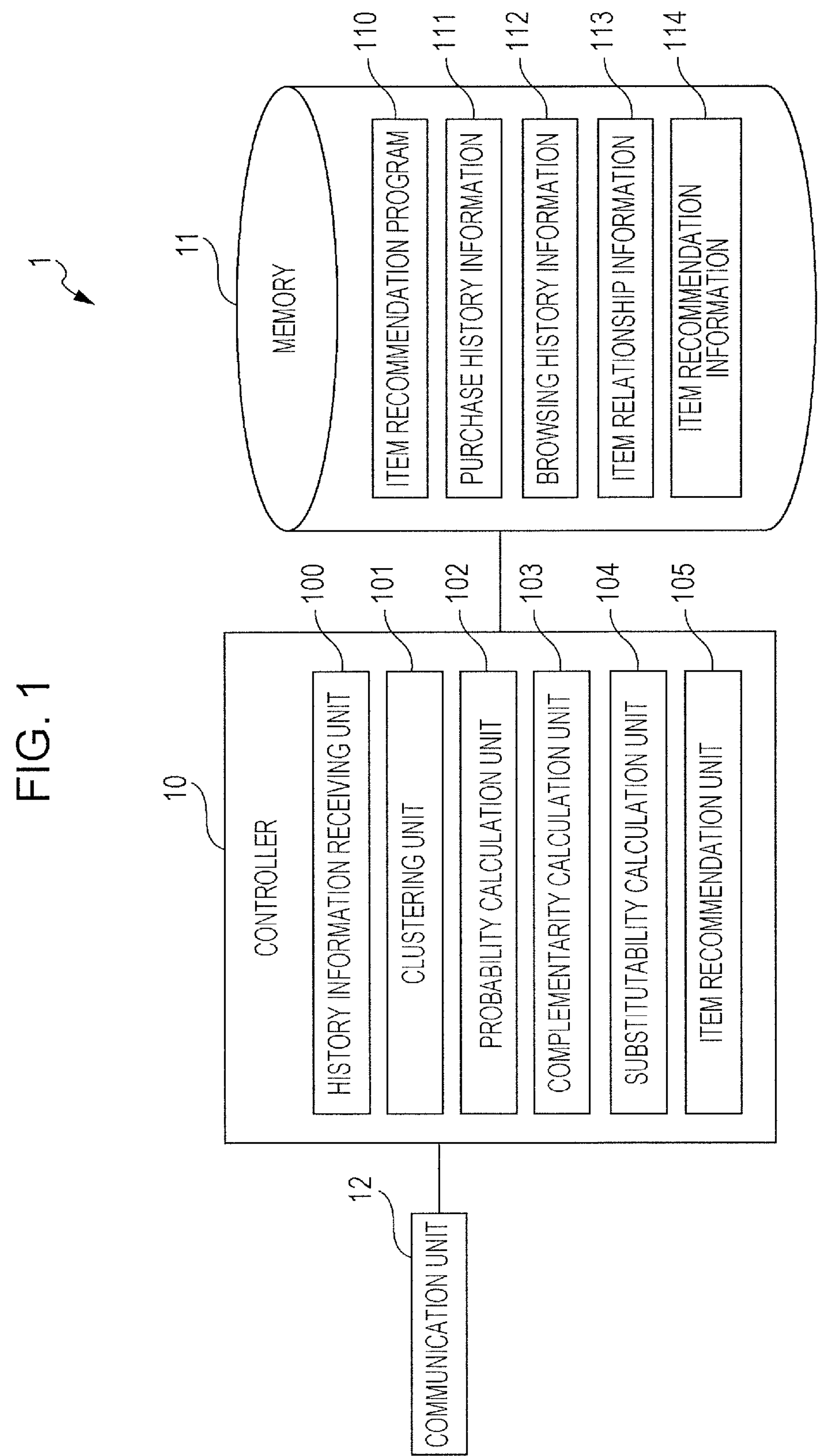
FIG. 1
1
11
MEMORY
110
111
112
113
114
ITEM RECOMMENDATION PROGRAM
PURCHASE HISTORY INFORMATION
BROWSING HISTORY INFORMATION
ITEM RELATIONSHIP INFORMATION
ITEM RECOMMENDATION INFORMATION
10
CONTROLLER
100
101
102
103
104
105
HISTORY INFORMATION RECEIVING UNIT
CLUSTERING UNIT
PROBABILITY CALCULATION UNIT
COMPLEMENTARITY CALCULATION UNIT
SUBSTITUTABILITY CALCULATION UNIT
ITEM RECOMMENDATION UNIT
12
COMMUNICATION UNIT

| USER ID | ITEM ID | TIME | SESSION |
|---|---|---|---|
| 001 | item3 | 3/15/2015 21:07 | 001 |
| 001 | item7 | 3/15/2015 21:07 | 001 |
| ⋮ | ⋮ | ⋮ | ⋮ |
| 001 | item2 | 3/16/2015 6:15 | 002 |
| 002 | item1 | 3/16/2015 19:50 | 001 |
| ⋮ | ⋮ | ⋮ | ⋮ |

| USER ID | ITEM ID | TIME | SESSION |
|---|---|---|---|
| 001 | item1 | 3/15/2015 20:50 | 001 |
| 001 | item3 | 3/15/2015 20:55 | 001 |
| 001 | item7 | 3/15/2015 20:57 | 001 |
| ⋮ | ⋮ | ⋮ | ⋮ |
| 001 | item2 | 3/16/2015 6:01 | 002 |
| 001 | item8 | 3/16/2015 6:03 | 002 |
| ⋮ | ⋮ | ⋮ | ⋮ |
| 002 | item1 | 3/15/2015 19:37 | 001 |
| ⋮ | ⋮ | ⋮ | ⋮ |

| ITEM ID | ITEM ID | COMPLEMENTARITY | SUBSTITUTABILITY |
|---|---|---|---|
| 001 | 002 | 1 | 5.6 |
| 001 | 003 | 2.0 | 1 |
| 001 | 004 | 4.0 | 1 |
| ⋮ | ⋮ | ⋮ | ⋮ |
| 002 | 003 | 1.1 | 1 |
| 002 | 004 | 5.0 | 1 |
| ⋮ | ⋮ | ⋮ | ⋮ |

NON-TRANSITORY COMPUTER READABLE MEDIUM AND INFORMATION PROCESSING APPARATUS

CROSS-REFERENCE TO RELATED APPLICATIONS

This application is based on and claims priority under 35 USC 119 from Japanese Patent Application No. 2015-083851 filed Apr. 16, 2015.

BACKGROUND

Technical Field

The present invention relates to a non-transitory computer readable medium and an information processing apparatus.

SUMMARY

According to an aspect of the invention, there is provided a non-transitory computer readable medium storing a program causing a computer to execute a process including calculating a value indicating a complementarity and a value indicating a substitutability, the values each being calculated as information indicating a relationship between multiple items on a basis of browsing history information and purchase history information of the items.

BRIEF DESCRIPTION OF THE DRAWINGS

Exemplary embodiments of the present invention will be described in detail based on the following figures, wherein:

FIG. 1 is a block diagram illustrating a configuration example of an information processing apparatus according to an exemplary embodiment;

FIG. 2 is a schematic configuration diagram illustrating an example of the configuration of purchase history information;

FIG. 3 is a schematic configuration diagram illustrating an example of the configuration of browsing history information;

FIG. 4 is a schematic configuration diagram illustrating an example of the configuration of item relationship information;

DETAILED DESCRIPTION

Exemplary Embodiment

Configuration of Information Processing Apparatus

Figure 5:
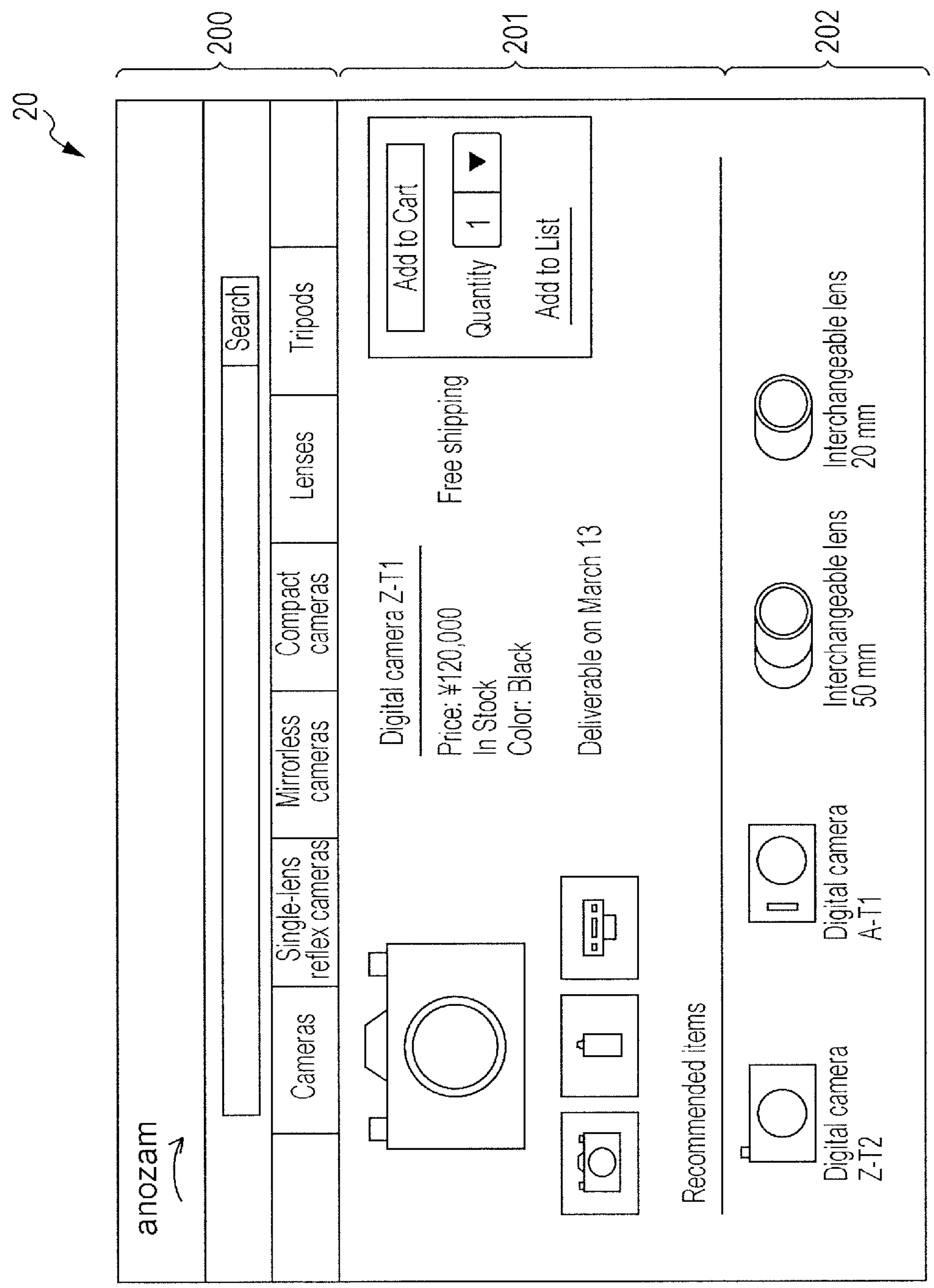
FIG. 5 is a schematic configuration diagram illustrating an example of display of a web page for browsing and purchasing an item.

FIG. 1 is a block diagram illustrating a configuration example of an information processing apparatus according to an exemplary embodiment.

An information processing apparatus 1 includes a controller 10, a memory 11, and a communication unit 12. The controller 10 includes a central processing unit (CPU) and other components, controls units of the information processing apparatus 1, and executes various programs. The memory 11 includes a storage medium such as a flash memory and is used to store information. The communication unit 12 communicates with external apparatuses through a network.

The controller 10 executes an item recommendation program 110 (described later) to thereby function as a history information receiving unit 100, a clustering unit 101, a probability calculation unit 102, a complementarity calculation unit 103, a substitutability calculation unit 104, an item recommendation unit 105, and other units. Note that the term "complementarity" denotes a relationship in which multiple items are required to satisfy the intention of a user. The term "substitutability" denotes a relationship in which just one of the multiple items is required to satisfy the intention of the user.

The history information receiving unit 100 receives browsing history information 112 and purchase history information 111 from a service provider that provides services of, for example, electronic commerce in which items and services are sold, purchased, and distributed through electronic information communications performed on a computer network. The browsing history information 112 indicates a history of item browsing performed by a user in the past in the electronic commerce, and the purchase history information 111 indicates a history of item purchasing performed by the user in the past.

The clustering unit 101 performs clustering to obtain clusters of users having a similar interest in browsed or purchased items on the basis of the browsing history information 112 and the purchase history information 111.

The probability calculation unit 102 calculates, on a per user cluster basis, a probability at which each item is browsed, a probability at which the item is purchased, a probability at which multiple items are browsed in the same session (simultaneous-browsing probability), and a probability at which multiple items are purchased in the same session (simultaneous-purchase probability). Note that in the session, a series of communications are performed when a user utilizes an electronic commerce service. To define sessions, sessions are divided by using various conceivable methods. For example, sessions are divided on the basis of an interval in which no communication is performed within a predetermined time.

Meanwhile, when multiple items have a relationship in which all of the items are required to satisfy the intention of the user, such as a relationship between an item of interest and a consumable therefor, the items have a mutually complementary relationship in which there is a high probability that browsing or purchasing one of the items leads to browsing or purchasing the other. In this case, the complementarity calculation unit 103 assumes that the items have a high complementarity and calculates a value indicating the complementarity in item relationship information 113 on the basis of the simultaneous-browsing probability and the simultaneous-purchase probability. A method for calculating a value indicating a complementarity will be described in detail in "Operation of Information Processing Apparatus".

When multiple items have a relationship in which just one of the items is required to satisfy the intention of the user, such as a relationship between items of interest in the same category, the items have a mutually substitutional relationship in which there is a high probability that browsing one of the items leads to browsing the other and there is a low probability that purchasing one of the items leads to purchasing the other. In this case, the substitutability calculation unit 104 assumes that the items have a high substitutability and calculates a value indicating the substitutability in the item relationship information 113 on the basis of the simultaneous-browsing probability and the simultaneous-purchase probability. A method for calculating a value indicating a substitutability will be described in detail in "Operation of Information Processing Apparatus".

The item recommendation unit 105 determines an item to be recommended before, during, and after purchase of an item on the basis of the values indicating the complementarity and the substitutability in the item relationship information 113 and presents the recommended item thus determined to the user.

The memory 11 is used to store the item recommendation program 110, the purchase history information 111, the browsing history information 112, the item relationship information 113, item recommendation information 114, and the like, the item recommendation program 110 causing the controller 10 to operate as the units 100 to 105 described above.

FIG. 2 is a schematic configuration diagram illustrating an example of the configuration of the purchase history information 111.

The purchase history information 111 has a user ID indicating an identifier of a user who has purchased an item, an item ID indicating an identifier of the purchased item, a time when the item was purchased, and a session indicating an identifier of a session in which the item was purchased.

FIG. 3 is a schematic configuration diagram illustrating an example of the configuration of the browsing history information 112.

The browsing history information 112 has a user ID indicating an identifier of a user who has browsed an item, an item ID indicating an identifier of the browsed item, a time when the item was browsed, and a session indicating an identifier of a session in which the item was browsed.

FIG. 4 is a schematic configuration diagram illustrating an example of the configuration of the item relationship information 113.

The item relationship information 113 has item IDs indicating identifiers of multiple items related to each other, a complementarity between the items, and a substitutability between the items.

Operation of Information Processing Apparatus

Next, (1) Basic Operation, (2) Complementarity and Substitutability Calculation Operations, and (3) Item Recommendation Operation will be described as actions of the present exemplary embodiment.

(1) Basic Operation

FIG. 5 is a schematic configuration diagram illustrating an example of display of a web page for browsing and purchasing an item.

First, a user accesses a web page to browse a desired item by using a terminal apparatus, for example, a personal computer (PC) of the user, the web page being managed by a server of an electronic commerce service provider. The terminal apparatus processes information transmitted from the server, and a web-page display screen 20 is thereby displayed on the display of the terminal apparatus, as illustrated in FIG. 5.

The web-page display screen 20 includes a menu display 200, an item information display 201, and an item recommendation information display 202. The menu display 200 includes an input box for searching for an item, a selection button for selecting an item category, and the like. The item information display 201 includes photos, the name, and the price of an item, various buttons for purchasing the item, and the like. The item recommendation information display 202 displays information regarding items recommended to the user who is browsing the item displayed in the item information display 201.

The server of the service provider records an item caused by the user to be displayed in the item information display 201 in browsing history information and records a purchased item in purchase history information.

The server of the service provider also transmits the purchase history information and the browsing history information to the information processing apparatus 1 to request the information processing apparatus 1 to transmit information regarding an item to be displayed in the item recommendation information display 202.

The information processing apparatus 1 receives the purchase history information and the browsing history information and stores the information as the purchase history information 111 and the browsing history information 112 in the memory 11.

(2) Complementarity and Substitutability Calculation Operations

Figure 6:
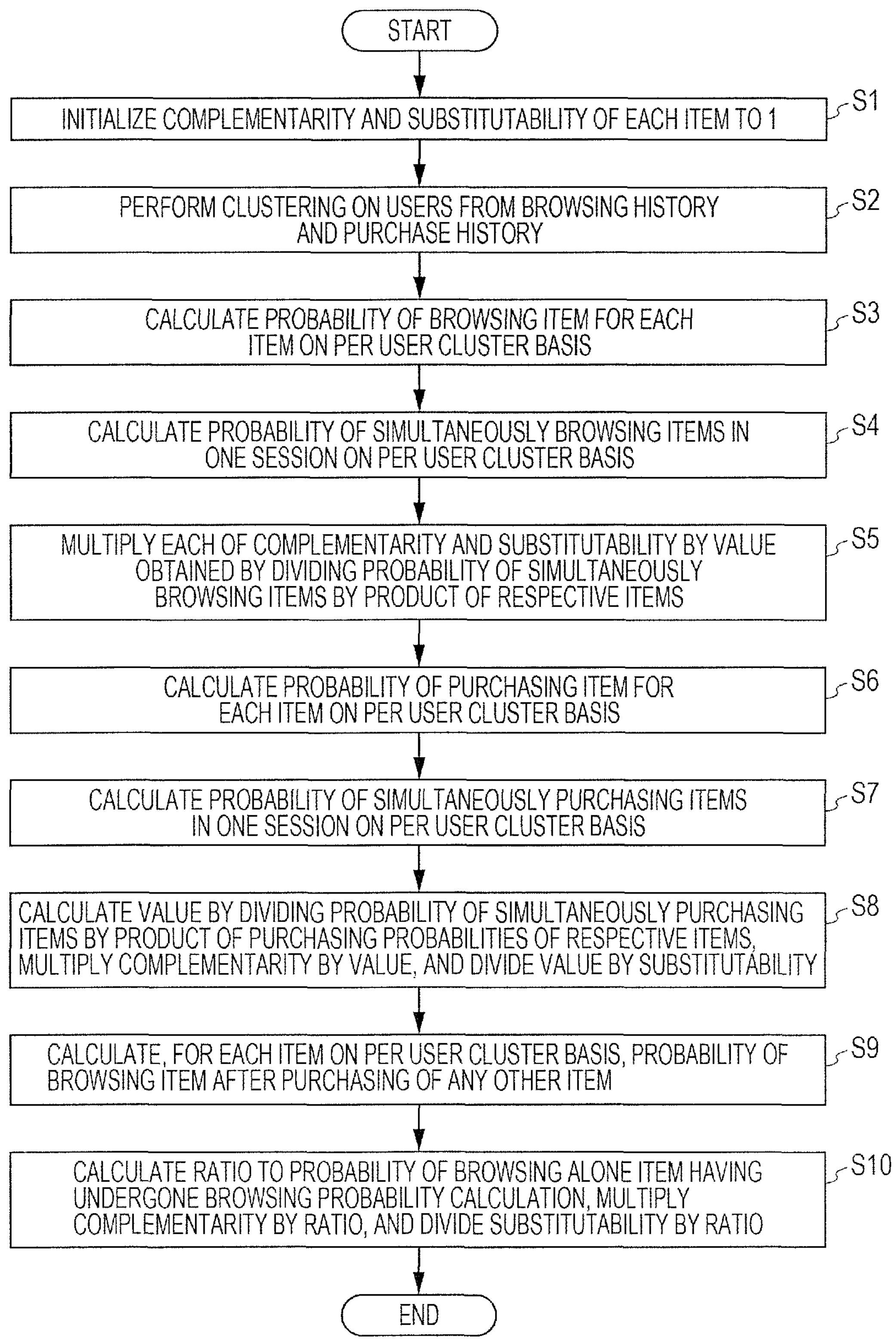
FIG. 6 is a flowchart illustrating an example of operation of the information processing apparatus.

FIG. 6 is a flowchart illustrating an example of operation of the information processing apparatus.

First, the complementarity calculation unit 103 and the substitutability calculation unit 104 initialize, to "1", values indicating a complementarity and a substitutability, respectively, in the item relationship information 113 illustrated in FIG. 4 (S1).

The clustering unit 101 performs clustering to obtain clusters of users having a similar interest, on the basis of item IDs for all of the sessions in the browsing history information 112 illustrated in FIG. 3 and in the purchase history information 111 illustrated in FIG. 2 (S2).

Note that the clustering is performed in order to enable a correlation in interest or taste between items to be used separately from a complementarity or a substitutability between the items. Specifically, in a group of users having a similar interest or taste, if there is no complementarity or no substitutability between items, tastes for the items (probabilities of browsing or purchasing the items) are conditionally independent. For example, it is ideally possible that a probability of browsing an item 1 and a probability of browsing an item 2 do not influence each other in terms of interest or taste.

The probability calculation unit 102 calculates, for each item, a probability of browsing the item on a per user cluster basis (S3). For example, in a case where the total number of times items including a specific item are browsed is 100 and where the number of times the specific item is browsed is 12, the probability of browsing the specific item is 0.12.

The probability calculation unit 102 also calculates a probability at which multiple items are browsed in the same session (simultaneous-browsing probability) on a per user cluster basis, the items including the item having undergone the foregoing browsing probability calculation (S4).

The complementarity is high in a case where the multiple items have the mutually complementary relationship in which there is a high probability that browsing one of the items leads to browsing the other, as in the relationship between an item of interest and a consumable therefor. Accordingly, the complementarity calculation unit 103 multiplies a value indicating the complementarity between the items in the item relationship information 113 by a value obtained by dividing the simultaneous-browsing probability of the items by the product of the probabilities of browsing the respective items (S5). Note that the division is performed to obtain a ratio of a probability of browsing the item having the complementarity to a probability of browsing alone the item having no complementarity.

The substitutability is high in a case where the multiple items have the mutually substitutional relationship in which there is a high probability that browsing one of the items leads to browsing the other, as in the relationship between items of interest in the same category. Accordingly, the substitutability calculation unit 104 multiplies a value indicating the substitutability between the items in the item relationship information 113 by the value obtained by dividing the simultaneous-browsing probability by the product of the probabilities of browsing the respective items (S5).

The probability calculation unit 102 calculates, for each item, a probability of purchasing the item on a per user cluster basis (S6).

The probability calculation unit 102 also calculates a probability of purchasing multiple items in the same session (simultaneous-purchase probability) on a per user cluster basis, the items including the item having undergone the foregoing purchasing probability calculation (S7).

The complementarity is high in a case where the multiple items have the mutually complementary relationship in which there is a high probability that purchasing one of the items leads to purchasing the other, as in the relationship between an item of interest and a consumable therefor. Accordingly, the complementarity calculation unit 103 multiplies the value indicating the complementarity between the items in the item relationship information 113 by a value obtained by dividing the simultaneous-purchase probability by the product of the probabilities of purchasing the respective items (S8).

The substitutability is high in a case where the multiple items have the mutually substitutional relationship in which there is a low probability that purchasing one of the items leads to purchasing the other, as in the relationship between items of interest in the same category. Accordingly, the substitutability calculation unit 104 performs division in such a manner that the value obtained by dividing the simultaneous-purchase probability by the product of the probabilities of purchasing the respective items is divided by the value indicating the substitutability between the items in the item relationship information 113 (S8).

The probability calculation unit 102 calculates, for each item on a per user cluster basis, a probability of browsing the item after any one of the other items is purchased (S9).

When multiple items including the item having undergone the foregoing browsing probability calculation have the complementarity, there is a high probability that purchasing one of the items leads to browsing the other item after the purchase of the one item. Accordingly, the complementarity calculation unit 103 calculates a ratio of the probability at which the item having undergone the foregoing browsing probability calculation is browsed after the purchase of any other item to the probability at which the item is browsed alone and multiplies the value indicating the complementarity by the calculated ratio (S10).

In contrast, when the multiple items have the substitutability, there is a low probability that purchasing one of the items leads to browsing the other item after the purchase of the one item. Accordingly, the substitutability calculation unit 104 calculates a ratio of the probability at which the item having undergone the foregoing browsing probability calculation is browsed after the purchase of any other item to the probability at which the item is browsed alone and divides the value indicating the substitutability by the calculated ratio (S10).

Note that the substitutability and the complementarity are incompatible with each other, and the complementarity calculation unit 103 and the substitutability calculation unit 104 may thus correct the substitutability and the complementarity in such a manner as to compensate a corresponding one of the substitutability and the complementarity for the other. For example, suppose a case where a value indicating the substitutability and a value indicating the complementarity are 10 and 5, respectively. In this case, one of the substitutability and the complementarity may be set in such a manner as to have a reference value of 1, specifically in such a manner that the value indicating the substitutability and the value indicating the complementarity may be corrected to 2 and 1, respectively.

In a case where an item a and an item b are substitutable with each other and where the item a and an item c are complementary to each other, the complementarity calculation unit 103 may assume that the item b and the item c are complementary to each other and may thus multiply the value indicating the complementarity between the item b and the item c by a predetermined value.

Since a probability of browsing or purchasing multiple items in the same session is decreased with the increase of item types, the complementarity calculation unit 103 and the substitutability calculation unit 104 may correct the probability by an amount of the decrease.

The probability of browsing or purchasing an item changes disproportionally, that is, non-linearly, with the increase of the purchasing quantity of the item, the sum paid for the item, the duration of browsing, and the number of times the item is browsed. Accordingly, probability distribution on which the change is reflected may be considered.

The substitutability between items may be set not to be influenced by the purchasing of one of the items a predetermined period after the previous purchasing. This is because, for example, if an item is browsed or purchased ten years after an item of the same type has been purchased, the browsing or purchasing is often not related to the previous purchasing. Note that a period in which the item is to be consumed may be used as the predetermined period. In addition, the substitutability may be set not to be influenced by the browsing or purchasing of the item in a different session.

A master-slave relationship in the complementarity between items may further be calculated on the basis of the chronological order of purchasing the items. For example, in a case where a printer is purchased and thereafter ink is purchased, the printer serves as a master, and the ink serves as a slave.

The complementarity calculation unit 103 and the substitutability calculation unit 104 may also calculate the values indicating the substitutability and the complementarity on a per item category basis.

The complementarity calculation unit 103 and the substitutability calculation unit 104 may also calculate values indicating the substitutability and the complementarity after the clustering unit 101 performs clustering on a browsing history or a purchase history to obtain user clusters on the basis of similarity among values indicating item substitutabilities and complementarities.

(3) Item Recommendation Operation

The item recommendation unit 105 determines an item to be recommended before, during, and after purchase of an item on the basis of the values indicating the complementarity and the substitutability in the item relationship information 113. The item recommendation unit 105 presents the recommended item to the user by displaying the recommended item in the item recommendation information display 202 illustrated in FIG. 5.

For example, before purchase of an item, the item recommendation unit 105 determines, as recommended items, items respectively having high values indicating the complementarity to and the substitutability with an item a user is browsing. This is effective in a case where which item desired by the user is unknown, that is, an item having the complementarity or an item having the substitutability.

During purchase of an item, the item recommendation unit 105 determines, as a recommended item, an item having a high value indicating the complementarity to the item the user is browsing. This enables recommendation of a consumable or the like required for the item the user purchases and meets the intention of the user.

In a case where the user is browsing multiple items having a high value indicating the substitutability, the item recommendation unit 105 may assume that the user is comparing the items with each other and may thus display word-of-mouth information and the like regarding the items in the item recommendation information display 202 illustrated in FIG. 5.

After purchase of an item, the item recommendation unit 105 determines, as a non-recommended item, an item having a high value indicating the substitutability with the purchased item. This is because the user does not require an item having a high value indicating the substitutability after the purchase. In a case where a first item and a second item are purchased within one session, the value indicating the complementarity is increased, and the value indicating the substitutability is decreased.

Other Exemplary Embodiments

Note that the present invention is not limited to the exemplary embodiment described above, and various modifications may be made without departing from the gist of the present invention. For example, an electronic commerce example has been described in the exemplary embodiment above. However, catalog booklets, flyers, or the like may be distributed in a user identifiable manner, and relationships between items may be assumed on the basis of whether the catalog booklets, flyers, or the like have been read and on the basis of results of purchase of items in the catalog booklets, flyers, or the like. Catalog booklets, flyers, or the like to be created next time on the basis of assumption results may also be modified on the basis of relationships each between items, and the modified catalog booklets, flyers, or the like may be sent to users.

The functions of the units 100 to 105 of the controller 10 are implemented by using the program in the exemplary embodiment, but all or some of the units may be implemented by hardware such as an application specific integrated circuit (ASIC). In addition, the program used in the exemplary embodiment described above may be provided in such a manner as to be stored in a recording medium such as a compact disc read-only memory (CD-ROM). Moreover, mutual changes, deletions, additions, and the like of the steps described above in the aforementioned exemplary embodiment may be made without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process comprising:

receiving browsing history information and purchase history information from a service provider;

calculating a value indicating a complementarity and a value indicating a substitutability, the values each being calculated as information indicating a relationship between a plurality of items on a basis of the browsing history information and the purchase history information of the items; and providing to a user a recommended item to a user based on the calculated value indicating a complementarity and the calculated value indicating a substitutability, wherein calculating the value indicating the substitutability is not influenced by the purchase history information of an item of the items that occurs after a predetermined period of time following the purchase of another of the items, and the value indicating the substitutability between a first item and a second item is reduced in response to the first item and the second item being purchased within one session.

2. The non-transitory computer readable medium according to claim 1, the process further comprising:

recommending, in response to the first item being designated, the second item on a basis of the value indicating the complementarity between the first item and the second item and the value indicating the substitutability between the first item and the second item.

3. The non-transitory computer readable medium according to claim 1, wherein response to the first item and the second item being purchased within the one session, the value indicating the complementarity is increased.

4. The non-transitory computer readable medium according to claim 1, wherein in response to the first item being purchased and thereafter the second item is browsed, the value indicating the complementarity is increased, and the value indicating the substitutability is decreased.

5. The non-transitory computer readable medium according to claim 1, wherein clustering is performed on a plurality of users on a basis of the browsing history information and the purchase history information, and the value indicating the complementarity and the value indicating the substitutability are calculated on a per cluster basis.

6. The non-transitory computer readable medium according to claim 1, wherein complementarity is a relationship in which multiple items are required to satisfy the intent of the user, and substitutability is a relationship where just one of a plurality of items is required to satisfy the intent of the user.

7. A non-transitory computer readable medium storing a program causing a computer to execute a process comprising:

receiving browsing history information and purchase history information from a service provider;

calculating information indicating a relationship between a plurality of items on a basis of the browsing history information and the purchase history information of the items; and providing to a user a recommended item to a user based on the calculated information indicating a complementarity and a calculated value indicating a substitutability, wherein calculating the value indicating the substitutability is not influenced by the purchase history information of an item of the items that occurs after a predetermined period of time following the purchase of another of the items, and the value indicating the substitutability between a first item and a second item is reduced in response to the first item and the second item being purchased within one session.

8. The non-transitory computer readable medium according to claim 7, wherein complementarity is a relationship in which multiple items are required to satisfy the intent of the user, and substitutability is a relationship where just one of a plurality of items is required to satisfy the intent of the user.

9. An information processing apparatus comprising:

a receiving unit configured to receive browsing history information and purchase history information from a service provider;

a calculation unit that calculates a value indicating a complementarity and a value indicating a substitutability, the values each being calculated as information indicating a relationship between a plurality of items on a basis of browsing history information and purchase history information of the items;

a recommendation unit configured to provide to a user a recommended item to a user based on the calculated value indicating a complementarity and the calculated value indicating a substitutability, wherein calculating the value indicating the substitutability is not influenced by the purchase history information of an item of the items that occurs after a predetermined period of time following the purchase of another of the items, and the value indicating the substitutability between a first item and a second item is reduced in response to the first item and the second item being purchased within one session.

10. The information processing apparatus according to claim 9, wherein complementarity is a relationship in which multiple items are required to satisfy the intent of the user, and substitutability is a relationship where just one of a plurality of items is required to satisfy the intent of the user.

* * * * *